US012658737B2

(12) United States Patent
Ryu et al.

(10) Patent No.: US 12,658,737 B2
(45) Date of Patent: Jun. 16, 2026

(54) ELECTRONIC DEVICE COMPRISING WIRELESS CHARGING CIRCUIT

(71) Applicant: Samsung Electronics Co., Ltd., Gyeonggi-do (KR)

(72) Inventors: Jooyeol Ryu, Gyeonggi-do (KR); Aram Kim, Gyeonggi-do (KR); Yeonsoo Kim, Gyeonggi-do (KR); Myeongkyun Baek, Gyeonggi-do (KR); Dongil Son, Gyeonggi-do (KR); Changgeun Oh, Gyeonggi-do (KR); Minho Lee, Gyeonggi-do (KR); Jaehyuk Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 740 days.

(21) Appl. No.: 18/079,401

(22) Filed: Dec. 12, 2022

(65) Prior Publication Data

US 2023/0131461 A1 Apr. 27, 2023

Related U.S. Application Data

(63) Continuation of application No. PCT/KR2021/019341, filed on Dec. 7, 2021.

(30) Foreign Application Priority Data

Dec. 17, 2020 (KR) ........................ 10-2020-0177775

(51) Int. Cl.
*H02J 7/00* (2026.01)
*G06F 3/01* (2006.01)
(Continued)

(52) U.S. Cl.
CPC .............. *H02J 50/60* (2016.02); *G06F 3/015* (2013.01); *G06F 3/16* (2013.01); *H02J 7/04* (2013.01);
(Continued)

(58) Field of Classification Search
CPC .......... H02J 50/60; H02J 50/005; H02J 50/10; H02J 50/80; H02J 7/007188; H02J 7/04; G06F 3/015; G06F 3/16
(Continued)

(56) References Cited

U.S. PATENT DOCUMENTS 10,636,017 B2 4/2020 Abou Mahmoud et al.
10,841,401 B2 11/2020 Li et al.
(Continued)

FOREIGN PATENT DOCUMENTS

CN 209068247 7/2019
JP 2001-128375 5/2001
(Continued)

OTHER PUBLICATIONS

PCT/ISA/210 Search Report issued on PCT/KR2021/019341, Apr. 19, 2022, pp. 5.
(Continued)

*Primary Examiner* — Zixuan Zhou
(74) *Attorney, Agent, or Firm* — The Farrell Law Firm, P.C.

(57) ABSTRACT

An electronic device include a microphone, a wireless charging circuit, a wireless communication circuit, and processor electrically connected with the microphone, the wireless charging circuit, and the wireless communication circuit. The processor acquires first information corresponding to an ambient sound of the electronic device through the microphone, acquires second information related to a sleep of a user from a wearable device through the wireless communication circuit, the wearable device being connected with the electronic device through wireless communication, and, when wireless charging is performed by using the wireless charging circuit, adjusts a charging voltage of the
(Continued)

wireless charging, based on at least one of the first information or the second information.

20 Claims, 7 Drawing Sheets

(51) Int. Cl.

| | |
|---|---|
| *G06F 3/16* | (2006.01) |
| *H02J 7/04* | (2006.01) |
| *H02J 7/90* | (2026.01) |
| *H02J 50/00* | (2016.01) |
| *H02J 50/10* | (2016.01) |
| *H02J 50/60* | (2016.01) |
| *H02J 50/80* | (2016.01) |

(52) U.S. Cl.
CPC ............ *H02J 7/971* (2026.01); *H02J 50/005* (2020.01); *H02J 50/10* (2016.02); *H02J 50/80* (2016.02)

(58) Field of Classification Search
USPC .......................................... 320/108; 307/104
See application file for complete search history.

(56) References Cited

U.S. PATENT DOCUMENTS

| | | | |
|---|---|---|---|
| 11,196,305 | B2 | 12/2021 | Lin et al. |
| 2016/0373166 | A1 | 12/2016 | Yang et al. |

| | | | | |
|---|---|---|---|---|
| 2017/0025887 | A1 | 1/2017 | Hyun et al. | |
| 2017/0047784 | A1 | 2/2017 | Jung et al. | |
| 2017/0070078 | A1* | 3/2017 | Hwang | ................. H02J 7/0047 |
| 2017/0117741 | A1 | 4/2017 | Lee et al. | |
| 2017/0296088 | A1 | 10/2017 | Cho | |
| 2017/0358942 | A1* | 12/2017 | Pugh | ...................... A61B 5/021 |

FOREIGN PATENT DOCUMENTS

| | | |
|---|---|---|
| KR | 10-2013-0027754 | 3/2013 |
| KR | 10-2015-0012646 | 2/2015 |
| KR | 10-1546226 | 8/2015 |
| KR | 10-1669877 | 10/2016 |
| KR | 10-1683651 | 12/2016 |
| KR | 10-2017-0011507 | 2/2017 |
| KR | 10-2017-0019824 | 2/2017 |
| KR | 10-2017-0118439 | 10/2017 |
| KR | 10-1788230 | 11/2017 |
| KR | 10-2018-0031541 | 3/2018 |
| KR | 10-2019-0083584 | 7/2019 |
| WO | WO 2018/222869 | 12/2018 |

OTHER PUBLICATIONS

PCT/ISA/237 Written Opinion issued on PCT/KR2021/019341, Apr. 19, 2022, pp. 4.
Korean Office Action dated Mar. 21, 2025 issued in counterpart application No. 10-2020-0177775, 12 pages.
KR Notice of Patent Grant dated Nov. 17, 2025 issued in counterpart application No. 10-2020-0177775, 5 pages.

* cited by examiner

ELECTRONIC DEVICE COMPRISING WIRELESS CHARGING CIRCUIT

CROSS-REFERENCE TO RELATED APPLICATION(S)

This application is a bypass continuation application of International Application No. PCT/KR2021/019341, filed on Dec. 7, 2021, and is based on and claims priority under 35 U.S.C. § 119 to Korean Patent Application No. 10-2020-0177775, filed on Dec. 17, 2020, in the Korean Intellectual Property Office, the entire disclosure of which is incorporated herein by reference.

TECHNICAL FIELD

The present disclosure relates generally to an electronic device including a wireless charging circuit.

BACKGROUND ART

With the development of information technologies, communication technologies, and semiconductor technologies, distribution and use of electronic devices is rapidly increasing. Such electronic devices may be portable and do not necessarily remain in respective unique areas, and increasingly provide various functions. For example, a mobile device can perform wireless communication with a wearable device by using wireless communication.

Recently released electronic devices provide wireless charging through a wireless charging circuit. Electronic devices including wireless charging circuits may provide power to a battery through a wireless charging pad without a wired connection, and, with the development of radio frequency (RF) technologies, wireless charging pads capable of quickly charging are being released. As wireless charging of electronic devices becomes possible, user convenience is enhanced.

DISCLOSURE

Technical Problem

When wireless charging is performed by using a wireless charging pad, an annoying noise may occur due to shaking of a capacitor mounted in the wireless charging pad, and this may cause a user a noise.

Special products (e.g., Tantal, T-HMC) used to reduce the annoying noise may be expensive, and even when the special product is used, the effect of reducing the annoying noise caused by wireless charging may not be satisfactory. In addition, a method of reducing a wireless charging speed for a fixed time in order to reduce the annoying noise exists, but this method may not be desirable since it increases the time it takes to charge a device.

Solution to Problem

The disclosure has been made to address the above-mentioned problems and disadvantages, and to provide at least the advantages described below.

According to an aspect of the disclosure, an electronic device is provided, which includes a microphone; a wireless charging circuit; a wireless communication circuit; and a processor electrically connected with the microphone, the wireless charging circuit, and the wireless communication circuit. The processor may be configured to acquire first information corresponding to an ambient sound of the electronic device through the microphone; acquire second information related to a sleep of a user from a wearable device through the wireless communication circuit, the wearable device being connected with the electronic device through wireless communication; and, when wireless charging is performed by using the wireless charging circuit, adjust a charging voltage of the wireless charging, based on at least one of the first information or the second information.

According to another aspect of the disclosure, an operating method is provided for an electronic device The operating method includes acquiring first information corresponding to an ambient sound of the electronic device through a microphone included in the electronic device; acquiring second information related to a sleep of a user from a wearable device through a wireless communication circuit included in the electronic device, the wearable device being connected with the electronic device through wireless communication; and, when wireless charging is performed by using a wireless charging circuit, adjusting a charging voltage of the wireless charging, based on at least one of the first information or the second information.

According to another aspect of the disclosure, an electronic device is provided, which performs wireless communication with a wireless charging pad by using in-band communication. The electronic device includes a microphone; a battery; a wireless charging circuit; a wireless communication circuit; and a processor electrically connected with the microphone, the battery, the wireless charging circuit, and the wireless communication circuit. The processor may be configured to acquire first information corresponding to an ambient sound of the electronic device through the microphone; acquire second information related to a sleep of a user from a wearable device through the wireless communication circuit, the wearable device being connected with the electronic device through wireless communication; when wireless charging is performed by using the wireless charging circuit, adjust a charging voltage of the wireless charging, based on at least one of the first information or the second information; and adjust an amount of charging power by adjusting a charging current of the wireless charging.

Advantageous Effects

According to various embodiments of the disclosure, in an electronic device including a wireless charging circuit, an annoying noise caused by wireless charging can be reduced based on ambient noise information of the electronic device or information related to a user's sleep.

Based on the above-described effect, charging power of wireless charging can be adjusted according to a use environment of a user, and a use environment more suitable for the user can be provided.

Further, an amount of power of wireless charging can be constantly maintained by adjusting a charging current while adjusting a charging voltage of wireless charging, and accordingly, charging performance of wireless charging can be constantly maintained.

Other various effects that can be directly or indirectly grasped through the present document may be provided.

BRIEF DESCRIPTION OF DRAWINGS

The above and other aspects, features, and advantages of certain embodiments of the disclosure will be more apparent from the following description taken in conjunction with the accompanying drawings, in which.

BEST MODE

Figure 1A:
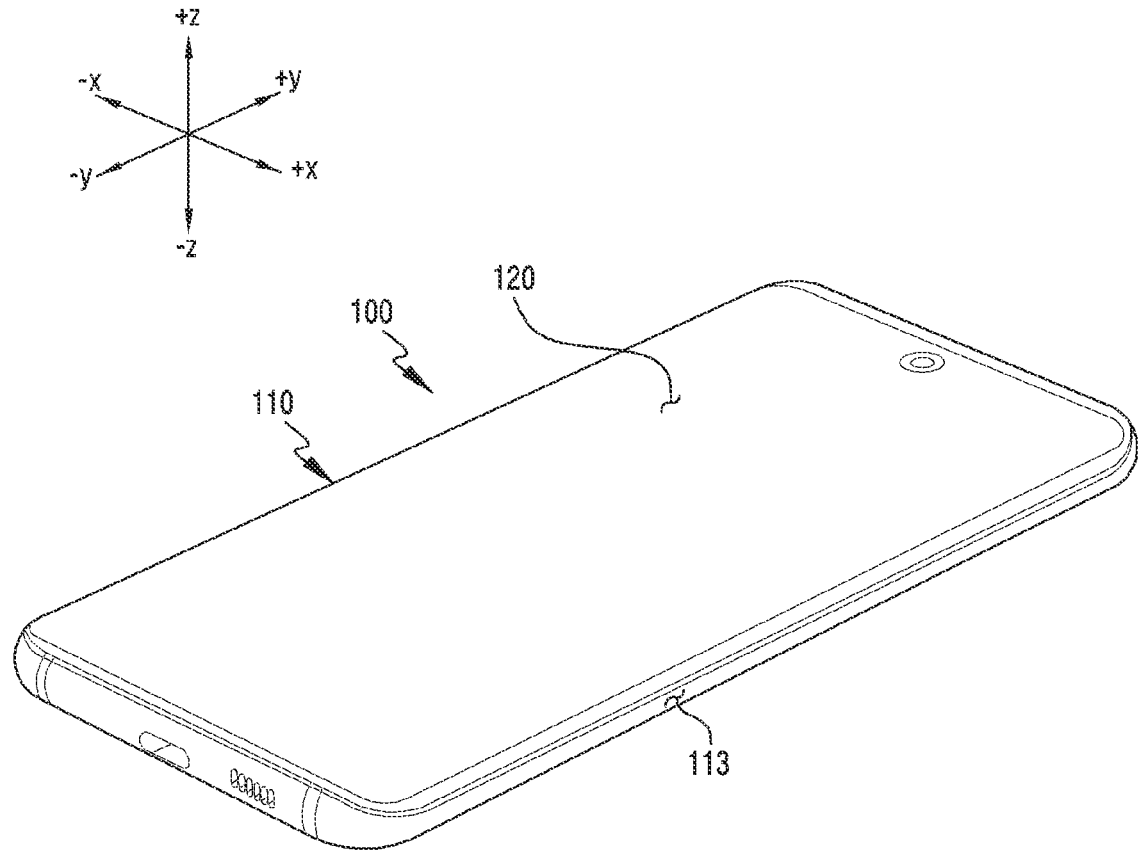
FIG. 1A illustrates a front surface of an electronic device, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Various embodiments disclosed in the present document include a method for reducing an annoying noise caused by wireless charging in an electronic device including a wireless charging circuit, and an apparatus thereof.

Figure 1B:
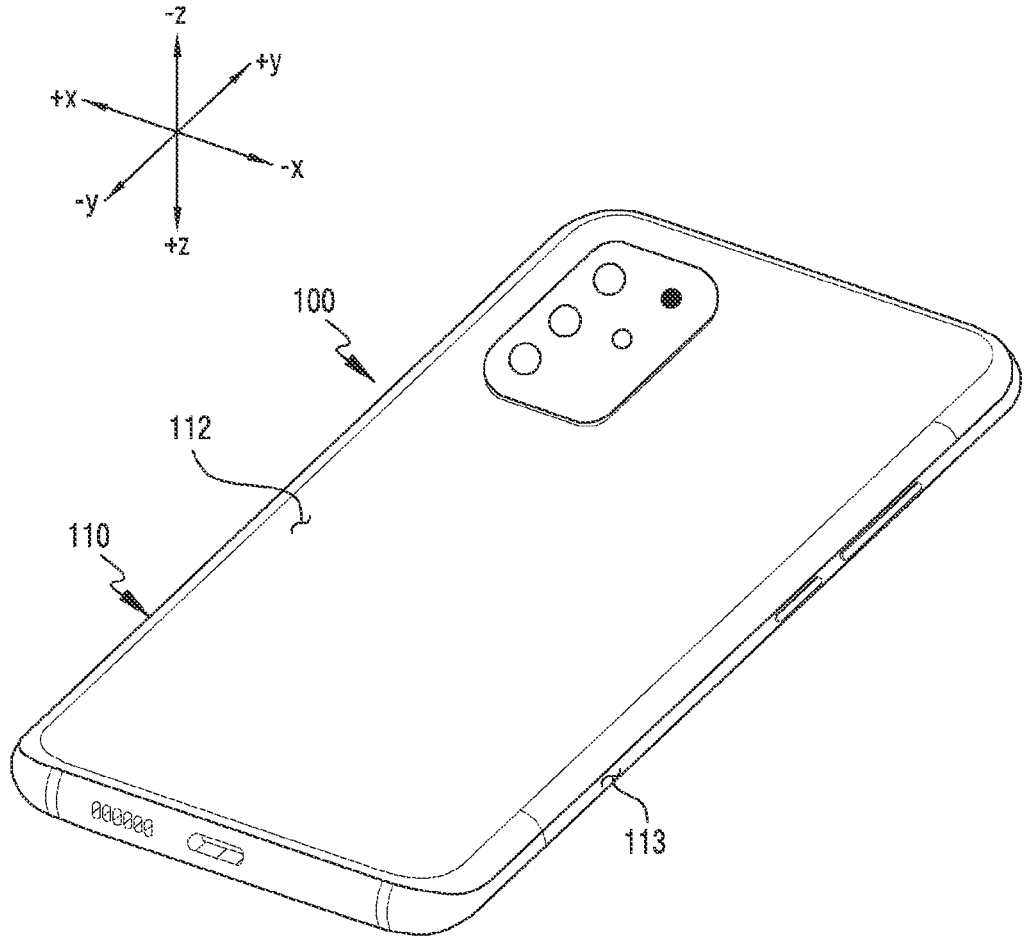
FIG. 1B illustrates a rear surface of the electronic device, according to an embodiment.

FIG. 1A illustrates a front surface of an electronic device (for example, a surface positioned in the +z direction of the electronic device 100 of FIG. 1A), according to an embodiment. FIG. 1B illustrates a rear surface of an electronic device (for example, a surface positioned in the −z direction of the electronic device 100 of FIG. 1B), according to an embodiment.

Referring to FIGS. 1A and 1B, an electronic device 100 includes a housing 110, which includes a front surface plate 111, a rear surface plate 112, and a side surface member 113 that surrounds a space between the front surface plate 111 and the rear surface plate 112.

A display 120 may be disposed on the front surface plate 111 of the housing 110. The display 120 may occupy most of the front surface (e.g., the surface positioned in the +z direction of the electronic device 100 of FIG. 1A) of the electronic device 100.

The rear surface plate 112 may be formed by coated or colored glass, ceramic, polymer, metal (e.g., aluminum, stainless steel (STS), or magnesium) or a combination of at least two of the above-mentioned materials. The rear surface plate 112 may include a curved portion that is bent toward the side surface member 113 from at least one side end and is seamlessly extended.

The side surface member 113 may be coupled with the rear surface plate 112 (for example, a surface positioned in the −z direction of the electronic device 100 of FIG. 1B) and may include metal and/or polymer. The rear surface plate 112 and the side surface member 113 may be integrally formed with each other, and may include the same material (e.g., a metallic material such as aluminum).

A conductive portion of the side surface member 113 may be electrically connected with a wireless communication circuit to operate as an antenna radiator to transmit and/or receive an RF signal of a designated frequency band. The wireless communication circuit may transmit an RF signal of a designated frequency band to the conductive portion of the side surface member 113 or may receive an RF signal of a designated frequency band from the conductive portion.

The electronic device 100 illustrated in FIGS. 1A and 1B is merely one example and does not limit a shape of an apparatus to which the technical concept disclosed in the present document is applied. The technical concept disclosed in the present document is applicable to various user devices including some portions operating as an antenna radiator. For example, the technical concepts of FIGS. 1A and 1B may be applied to a foldable electronic device that employs a flexible display and a hinge structure to be foldable in a horizontal direction or foldable in a vertical direction, or a tablet or notebook computer.

Figure 2:
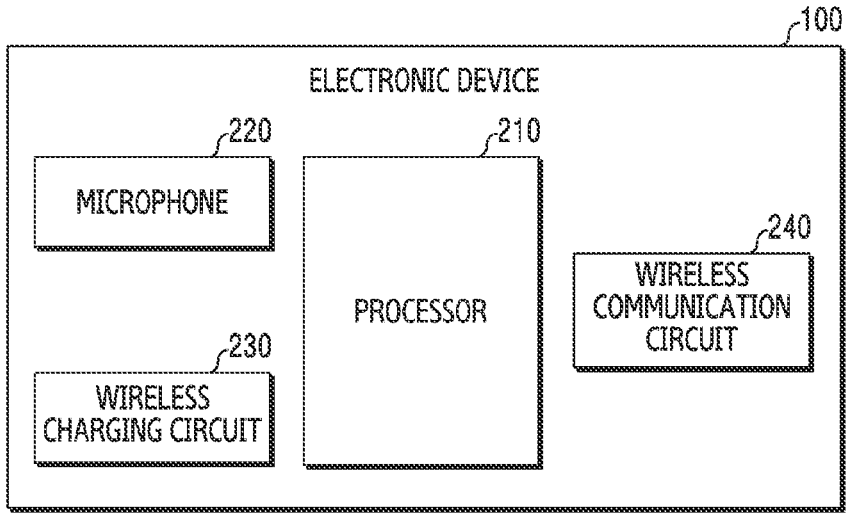
FIG. 2 illustrates a hardware configuration of an electronic device, according to an embodiment.

FIG. 2 illustrates a hardware configuration of an electronic device 100, according to an embodiment.

Referring to FIG. 2, the electronic device 100 includes a processor 210, a microphone 220, a wireless charging circuit 230, and a wireless communication circuit 240. The electronic device 100 may further include other configurations in addition to the processor 210, the microphone 220, the wireless charging circuit 230, and the wireless communication circuit 240. For example, the electronic device 100 may further include a battery.

The processor 210 may be electrically connected with the microphone 220, the wireless charging circuit 230, and the wireless communication circuit 240. The processor 210 may be electrically connected with the wireless communication circuit 240 to perform wireless communication with an external device by using the wireless communication circuit 240.

Figure 3:
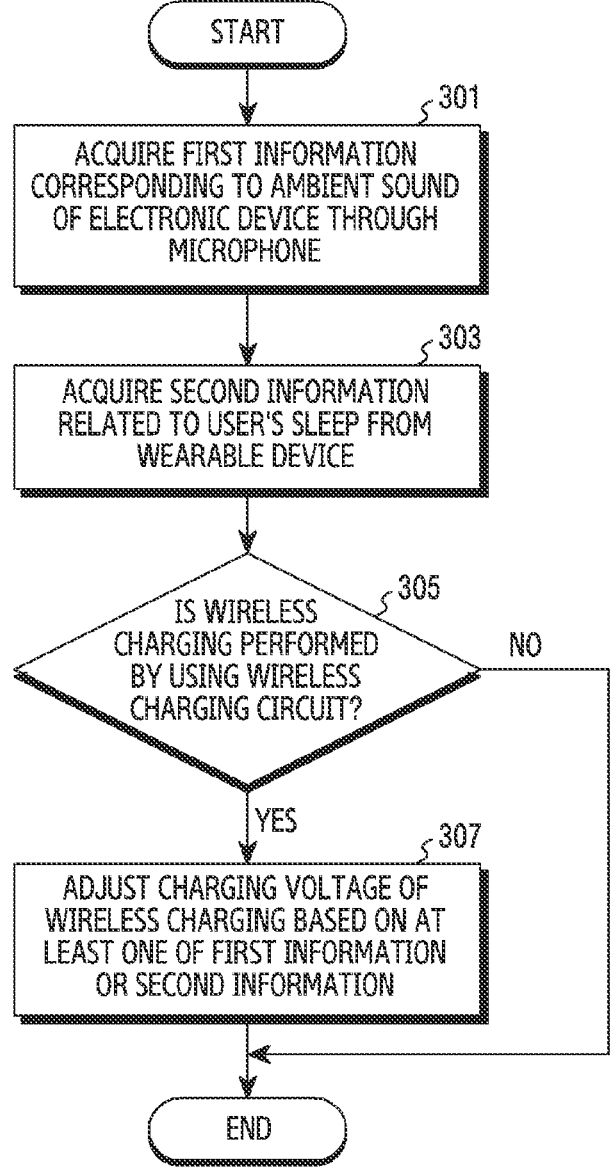
FIG. 3 illustrates an operation of an electronic device, according to an embodiment.

FIG. 3 illustrates an operation of an electronic device, according to an embodiment.

Referring to FIG. 3, the electronic device 100 including a wireless charging circuit may reduce an annoying noise caused by wireless charging, based on ambient noise information of the electronic device 100 or information related to a user's sleep. Steps 301 to 307 may be understood as being performed by the processor 210 included in the electronic device 100.

In step 301, the processor 210 acquires first information corresponding to an ambient sound of the electronic device 100 through a microphone 220. In an example, the processor 210 may acquire information corresponding to an ambient noise of the electronic device 100 through the microphone 220.

In step 303, the processor 210 acquires second information related to with sleep of a user (e.g., a user wearing a smart watch) from a wearable device (for example, a smart watch).

In step 305, the processor 210 determines whether wireless charging is performed by using a wireless charging circuit 230. For example, when the electronic device 100 and a wireless charging pad are positioned within a designated distance from each other, the processor 210 may determine that wireless charging is performed by using the wireless charging circuit 230. Additionally or alternatively, when the electronic device 100 and the wireless charging pad exchange a designated packet, the processor 210 may determine that wireless charging is performed by using the wireless charging circuit 230.

When it is determined that wireless charging is performed by using the wireless charging circuit 230 in step 305, the processor 210 adjusts a charging voltage of the wireless charging, based on at least one of the first information or the second information, in step 307. For example, when it is determined that wireless charging is performed by using the wireless charging circuit 230, the processor 210 may adjust the wireless charging voltage within about 5 volts (V). Additionally or alternatively, the wireless charging volage that is adjusted when the processor 210 determines that wireless charging is performed by using the wireless charging circuit 230 is not limited to about 5V or less, and may have various values according to performance of the wireless charging circuit 230. For example, when it is determined that wireless charging is performed by using the wireless charging circuit 230, the processor 210 may adjust the wireless charging voltage to have a designated value between about 5V and about 10V.

When it is determined that wireless charging is not performed by using the wireless charging circuit 230 in step 305, the processor 210 does not perform an operation.

The electronic device 100 may perform wireless communication with a wireless charging pad in an in-band method. The in-band method may refer to an amplitude shift keying (ASK) method through back-scatter modulation. An annoying noise may occur according to wireless charging due to in-band communication between the electronic device 100 and the wireless charging pad.

Additionally, the processor 210 may perform step 301 and step 303 after performing step 305. For example, when it is determined that wireless charging is performed by using the wireless charging circuit 230, the processor 210 may acquire the first information corresponding to the ambient sound of the electronic device 100 through the microphone 220, or may acquire the second information related to the user's sleep from the wearable device. In another example, when it is determined that wireless charging is not performed by using the wireless charging circuit 230, the processor 210 may finish the operation without acquiring the first information corresponding to the ambient sound of the electronic device 100 or the second information related to the user's sleep.

Figure 4:
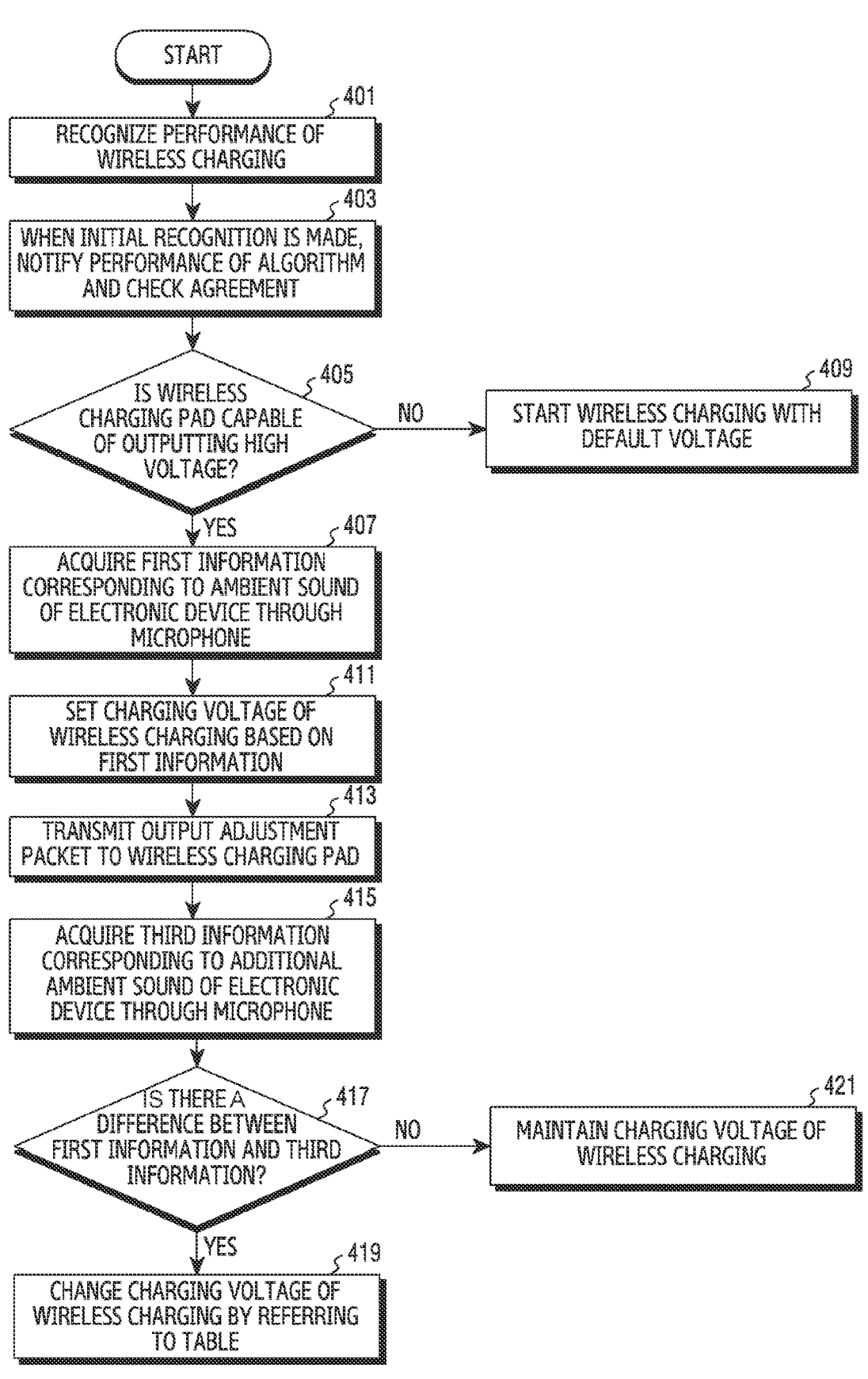
FIG. 4 illustrates an operation of an electronic device, according to an embodiment.

FIG. 4 illustrates an operation of an electronic device, according to an embodiment.

Referring to FIG. 4, the electronic device 100 may perform wireless charging through a wireless charging pad which is capable of outputting a high voltage, and may change a charging voltage of wireless charging by using information corresponding to an additional ambient sound of the electronic device 100 through the microphone 220. Steps 401 to 421 may be understood as being performed by the processor 210 included in the electronic device 100.

In step 401, the processor 210 recognizes that wireless charging is performed. Step 401 may be understood as an operation corresponding to detecting whether wireless charging is performed by using the wireless charging circuit in step 305 of FIG. 3.

In step 403, when wireless charging being performed is initially recognized, the processor 210 notifies performance of an algorithm and checks for an agreement. For example, when it is initially recognized that wireless charging is performed, the processor 210 may introduce (or notify) that separate control is performed through first information corresponding to an ambient sound of the electronic device 100 or second information related to a user's sleep, or may identify agreement from a user through a pop-up.

In step 405, the processor 210 determines whether a wireless charging pad for performing wireless charging is capable of outputting a high voltage. Step 405 may correspond to an operation of identifying, by the processor 210, whether the wireless charging pad has a variable output. For example, in step 405, the processor 210 may identify whether the wireless charging pad is capable of outputting both a low voltage and a high voltage.

When it is determined that the wireless charging pad is a wireless charging pad capable of outputting a high voltage in step 405, the processor 210 acquires first information corresponding to an ambient sound of the electronic device 100 through the microphone 220 in step 407.

When it is determined that the wireless charging pad is not the wireless charging pad capable of outputting a high voltage in step 405, the processor 210 starts wireless charging with a default voltage in step 409. The default voltage may be about 5 V.

In step 411, the processor 210 sets a charging voltage of the wireless charging, based on the first information corresponding to the ambient sound of the electronic device 100. For example, when the first information corresponding to the ambient sound of the electronic device 100 has a low decibel (dB) value, the processor 210 may set the charging voltage of the wireless charging to be low. Additionally or alternatively, when the first information corresponding to the ambient sound of the electronic device 100 has a high dB value, the processor 210 may set the charging voltage of the wireless charging to be high. In addition, the processor 210 may enhance a use environment of a user using the electronic device 100 by adjusting the charging voltage of the wireless charging according to ambient sound information of the electronic device 100.

In step 413, the processor 210 transmits an output adjustment packet to the wireless charging pad. For example, the processor 210 may transmit the output adjustment packet to the wireless charging pad by using in-band communication.

In step 415, the processor 210 acquires third information corresponding to an additional ambient sound of the electronic device 100 through the microphone 220. For example, the processor 210 may additionally acquire the third information which is different from the first information acquired through the microphone 220.

In step 417, the processor 210 determines whether there is a difference between the first information corresponding to the ambient sound of the electronic device 100 and the third information corresponding to the additional ambient sound of the electronic device 100. The difference between the first information and the third information may be determined according to a difference between dB values. For example, when a dB value of the third information has a difference from that of the first information by a designated value or more, the processor 210 may determine that there is a difference between the first information and the third information.

When it is determined that there is a difference between the first information and the third information in step 417, the processor 210 adjusts the charging voltage of the wireless charging by referring to a table in step 419. The table may be a voltage table and may contain information indicating that, when the dB value of the third information is high, the charging voltage of the wireless charging is 11V; when the dB value of the third information is an intermediate value, the charging voltage of the wireless charging is 9V; and, when the dB value of the third information is low, the charging voltage of the wireless charging is 5V.

When it is determined that there is no difference between the first information and the third information in step 417, the processor 210 maintains the charging voltage of the wireless charging in step 421. For example, when it is determined that there is no difference between the first information and the third information, the processor 210 may maintain the charging voltage of the wireless charging which is based on the first information.

Figure 5:
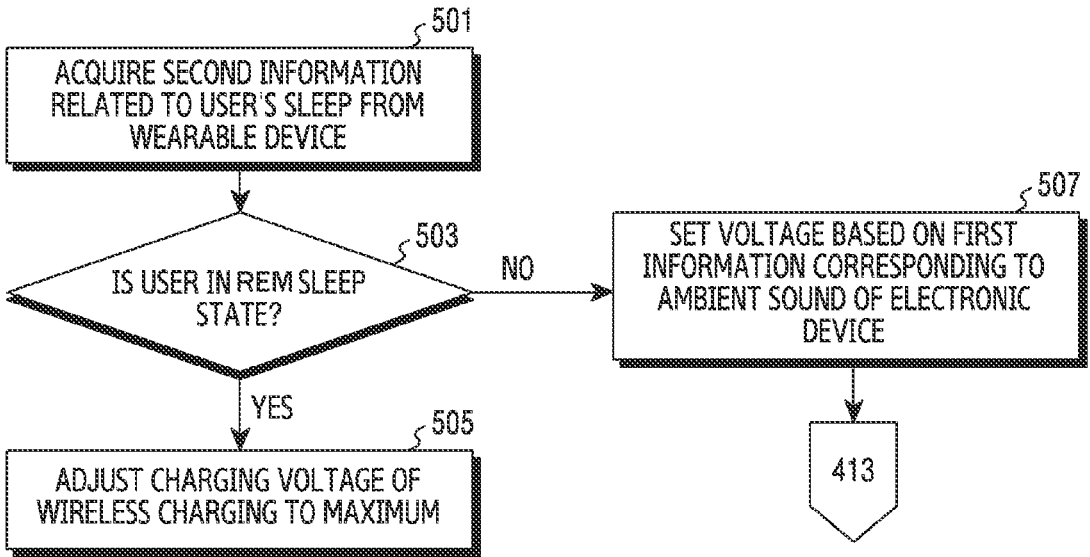
FIG. 5 illustrates an operation of an electronic device, according to an embodiment.

FIG. 5 illustrates an operation of an electronic device, according to an embodiment.

Referring to FIG. 5, the electronic device 100 may adjust a charging voltage of wireless charging based on information which is acquired from a wearable device. Steps 501 to 507 may be understood as being performed by the processor 210 included in the electronic device 100.

In step 501, the processor 210 acquires second information related to sleep of a user (for example, a user wearing a smart watch) from a wearable device (for example, a smart watch). The second information related to the user's sleep may include information regarding a time that is elapsed after the user falls asleep, or information regarding a user's brainwave during the sleep. In addition, the second information related to the user's sleep may refer to biometric information such as a heart rate (e.g., photoplethysmography (PPG)) or an electrocardiogram (ECG).

The electronic device 100 may acquire the second information related to the user's sleep through a sensor included in the wearable device. For example, the wearable device may acquire biometric information such as a heart rate or ECG through the sensor included therein, and the electronic device 100 may receive and acquire the biometric information such as a heart rate or ECG acquired by the wearable device.

In addition, the electronic device 100 may identify whether the user of the wearable device is in a sleep state through an acceleration sensor and/or a gyro sensor included in the wearable device. For example, when the user wearing the wearable device is sleeping, the electronic device 100 may determine that the user is in the sleep state by receiving sleep information of the user which is acquired through the acceleration sensor and/or gyro sensor included in the wearable device. Additionally or alternatively, the information that the electronic device 100 receives from the wearable device to identify a user's sleep state is not limited to the above-described example, and the electronic device 100 may determine whether the user is in the sleep state by receiving a variety of biometric information (for example, total body fluid or temperature) of the user from the wearable device.

In step 503, the processor 210 determines whether the user is in a rapid eye movement (REM) sleep state. The REM sleep state refers to a light sleep state which is similar to when the user is awake.

When it is determined that the user is in the REM sleep state in step 503, the processor 210 adjusts the charging voltage of the wireless charging to a maximum (e.g., a maximum charging level) in step 505. For example, when the user is in the REM sleep state, the charging voltage of the wireless charging may be adjusted to about 11V.

When it is determined that the user is not in the REM sleep state in step 503, the processor 210 sets a voltage based on first information corresponding to an ambient sound of the electronic device 100 in step 507. For example, when the user is not in the REM sleep state and an ambient dB of the electronic device 100 is low based on the first information corresponding to the ambient sound of the electronic device 100, the processor 210 may set the charging voltage of the wireless charging to a default voltage. A user's sleep environment of the electronic device 100 may be enhanced by adjusting the charging voltage of the wireless charging according to a user's sleep state.

The processor 210 may perform step 505 or 507 without performing step 503 after performing step 501. In addition, the processor 210 may acquire the second information related to the user's sleep from the wearable device, and may adjust the charging voltage of the wireless charging to the maximum regardless of whether the user is in the REM sleep state. Additionally, the processor 210 may acquire the second information related to the user's sleep from the wearable device, and may set the voltage based on the first information corresponding to the ambient sound of the electronic device 100 regardless of whether the user is in the REM sleep state.

Figure 6:
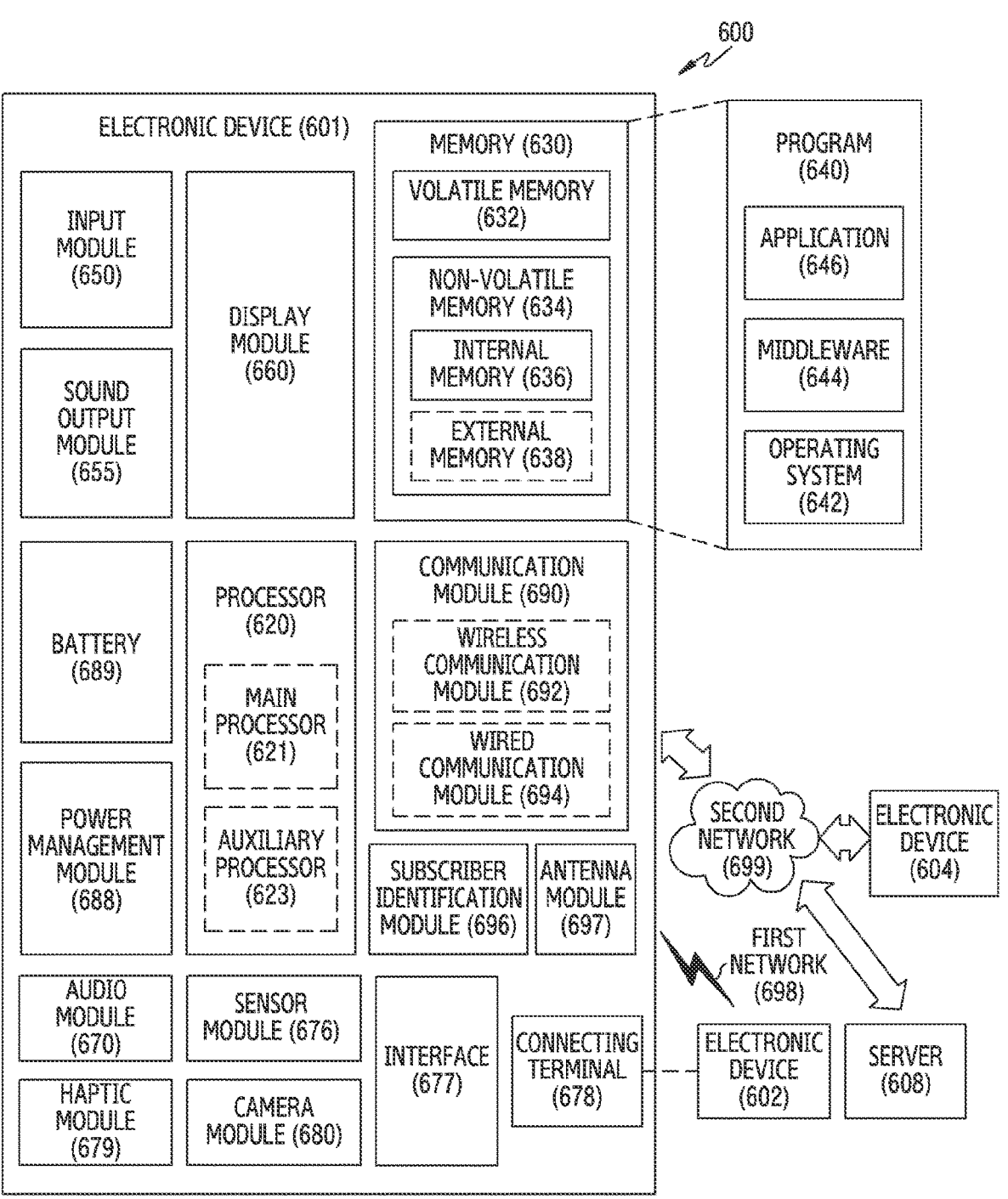
FIG. 6 illustrates an electronic device in a network environment, according to an embodiment.

FIG. 6 is a block diagram illustrating an electronic device 601 in a network environment 600 according to various embodiments. Referring to FIG. 6, the electronic device 601 in the network environment 600 may communicate with an electronic device 602 via a first network 698 (e.g., a short-range wireless communication network), or at least one of an electronic device 604 or a server 608 via a second network 699 (e.g., a long-range wireless communication network). According to an embodiment, the electronic device 601 may communicate with the electronic device 604 via the server 608. According to an embodiment, the electronic device 601 may include a processor 620, memory 630, an input module 650, a sound output module 655, a display module 660, an audio module 670, a sensor module 676, an interface 677, a connecting terminal 678, a haptic module 679, a camera module 680, a power management module 688, a battery 689, a communication module 690, a subscriber identification module (SIM) 696, or an antenna module 697. In some embodiments, at least one of the components (e.g., the connecting terminal 678) may be omitted from the electronic device 601, or one or more other components may be added in the electronic device 601. In some embodiments, some of the components (e.g., the sensor module 676, the camera module 680, or the antenna module 697) may be implemented as a single component (e.g., the display module 660).

The processor 620 may execute, for example, software (e.g., a program 640) to control at least one other component (e.g., a hardware or software component) of the electronic device 601 coupled with the processor 620, and may perform various data processing or computation. According to one embodiment, as at least part of the data processing or computation, the processor 620 may store a command or data received from another component (e.g., the sensor module 676 or the communication module 690) in volatile memory 632, process the command or the data stored in the volatile memory 632, and store resulting data in non-volatile memory 634. According to an embodiment, the processor 620 may include a main processor 621 (e.g., a central processing unit (CPU) or an application processor (AP)), or an auxiliary processor 623 (e.g., a graphics processing unit (GPU), a neural processing unit (NPU), an image signal processor (ISP), a sensor hub processor, or a communication processor (CP)) that is operable independently from, or in conjunction with, the main processor 621. For example, when the electronic device 601 includes the main processor 621 and the auxiliary processor 623, the auxiliary processor 623 may be adapted to consume less power than the main processor 621, or to be specific to a specified function. The auxiliary processor 623 may be implemented as separate from, or as part of the main processor 621.

The auxiliary processor 623 may control at least some of functions or states related to at least one component (e.g., the display module 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to an embodiment, the auxiliary processor 623 (e.g., an image signal processor or a communication processor) may be implemented as part of another component (e.g., the camera module 680 or the communication module 690) functionally related to the auxiliary processor 623. According to an embodiment, the auxiliary processor 623 (e.g., the neural processing unit) may include a hardware structure specified for artificial intelligence model processing. An artificial intelligence model may be generated by machine learning. Such learning may be performed, e.g., by the electronic device 601 where the artificial intelligence is performed or via a separate server (e.g., the server 608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input module 650 may receive a command or data to be used by another component (e.g., the processor 620) of the electronic device 601, from the outside (e.g., a user) of the electronic device 601. The input module 650 may include, for example, a microphone, a mouse, a keyboard, a key (e.g., a button), or a digital pen (e.g., a stylus pen).

The sound output module 655 may output sound signals to the outside of the electronic device 601. The sound output module 655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 660 may visually provide information to the outside (e.g., a user) of the electronic device 601. The display module 660 may include, for example, a display, a hologram device, or a projector and control circuitry to control a corresponding one of the display, hologram device, and projector. According to an embodiment, the display module 660 may include a touch sensor adapted to detect a touch, or a pressure sensor adapted to measure the intensity of force incurred by the touch.

The audio module 670 may convert a sound into an electrical signal and vice versa. According to an embodiment, the audio module 670 may obtain the sound via the input module 650, or output the sound via the sound output module 655 or a headphone of an external electronic device (e.g., an electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to an embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to an embodiment, the connecting terminal 678 may include, for example, a HDMI connector, a USB connector, a SD card connector, or an audio connector (e.g., a headphone connector).

The haptic module 679 may convert an electrical signal into a mechanical stimulus (e.g., a vibration or a movement) or electrical stimulus which may be recognized by a user via his tactile sensation or kinesthetic sensation. According to an embodiment, the haptic module 679 may include, for example, a motor, a piezoelectric element, or an electric stimulator.

The camera module 680 may capture a still image or moving images. According to an embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to an embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the application processor (AP)) and supports a direct (e.g., wired) communication or a wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or infrared data association (IrDA)) or the second network 699 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The wireless communication module 692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 692 may support a high-frequency band (e.g., the mmWave band) to achieve, e.g., a high data transmission rate. The wireless communication module 692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 692 may support various requirements specified in the electronic device 601, an external electronic device (e.g., the electronic device 604), or a network system (e.g., the second network 699). According to an embodiment, the wireless communication module 692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 697 may transmit or receive a signal or power to or from the outside (e.g., the external electronic device) of the electronic device 601. According to an embodiment, the antenna module 697 may include an antenna including a radiating element composed of a conductive material or a conductive pattern formed in or on a substrate (e.g., a printed circuit board (PCB)). According to an embodiment, the antenna module 697 may include a plurality of antennas (e.g., array antennas). In such a case, at least one antenna appropriate for a communication scheme used in the communication network, such as the first network 698 or the second network 699, may be selected, for example, by the communication module 690 (e.g., the wireless communication module 692) from the plurality of antennas. The signal or the power may then be transmitted or received between the communication module 690 and the external electronic device via the selected at least one antenna. According to an embodiment, another component (e.g., a radio frequency integrated circuit (RFIC)) other than the radiating element may be additionally formed as part of the antenna module 697.

According to various embodiments, the antenna module 697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 601 and the external electronic device 604 via the server 608 coupled with the second network 699. Each of the electronic devices 602 or 604 may be a device of a same type as, or a different type, from the electronic device 601. According to an embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, mobile edge computing (MEC), or client-server computing technology may be used, for example. The electronic device 601 may provide ultra low-latency services using, e.g., distributed computing or mobile edge computing. In another embodiment, the external electronic device 604 may include an internet-of-things (IoT) device. The server 608 may be an intelligent server using machine learning and/or a neural network. According to an embodiment, the external electronic device 604 or the server 608 may be included in the second network 699. The electronic device 601 may be applied to intelligent services (e.g., smart home, smart city, smart car, or healthcare) based on 5G communication technology or IoT-related technology.

According to various embodiments, an electronic device may include a microphone, a wireless charging circuit, a wireless communication circuit, and at least one processor electrically connected with the microphone, the wireless charging circuit, and the wireless communication circuit, and the at least one processor may acquire first information corresponding to an ambient sound of the electronic device through the microphone, may acquire second information related to a sleep of a user from a wearable device through the wireless communication circuit, the wearable device being connected with the electronic device through wireless communication, and, when wireless charging is performed by using the wireless charging circuit, may adjust a charging voltage of the wireless charging, based on at least one of the first information or the second information.

According to an embodiment, the electronic device may further include a battery.

According to an embodiment, the electronic device may perform wireless communication with a wireless charging pad by using in-band communication.

According to an embodiment, when the wireless charging pad is not a wireless charging pad capable of outputting a high voltage, the processor may start the wireless charging with a default voltage.

According to an embodiment, the processor may adjust an amount of charging power by adjusting a charging current of the wireless charging.

According to an embodiment, the processor may acquire third information that is different from the first information and corresponds to an ambient sound of the electronic device through the microphone.

According to an embodiment, when there is a difference between the first information and the third information, the processor may adjust the charging voltage of the wireless charging based on a difference value between the first information and the third information.

According to an embodiment, the processor may determine whether the user is in an REM sleep state, based on the second information.

According to an embodiment, when the user is in the REM sleep state, the processor may adjust the charging voltage of the wireless charging to a maximum output voltage.

According to an embodiment, when the user is not in the REM sleep state, the processor may adjust the charging voltage of the wireless charging based on the first information.

According to various embodiments, an operating method of an electronic device may include acquiring first information corresponding to an ambient sound of the electronic device through a microphone included in the electronic device; acquiring second information related to a sleep of a user from a wearable device through a wireless communication circuit included in the electronic device, the wearable device being connected with the electronic device through wireless communication; and, when wireless charging is performed by using a wireless charging circuit, adjusting a charging voltage of the wireless charging, based on at least one of the first information or the second information.

According to an embodiment, the method may further include adjusting an amount of charging power of the wireless charging by adjusting a charging current of the wireless charging.

According to an embodiment, the method may include acquiring third information that is different from the first information and corresponds to an ambient sound of the electronic device through the microphone.

According to an embodiment, the method may further include, when there is a difference between the first information and the third information, adjusting the charging voltage of the wireless charging based on a difference value between the first information and the third information.

According to an embodiment, the method may further include, when the user is in an REM sleep state, adjusting the charging voltage of the wireless charging to a maximum output voltage; and, when the user is not in the REM sleep state, adjusting the charging voltage of the wireless charging based on the first information.

According to various embodiments, an electronic device which performs wireless communication with a wireless charging pad by using in-band communication may include a microphone, a battery, a wireless charging circuit, a wireless communication circuit, and processor electrically connected with the microphone, the battery, the wireless charging circuit, and the wireless communication circuit. The processor may acquire first information corresponding to an ambient sound of the electronic device through the microphone, may acquire second information related to a sleep of a user from a wearable device through the wireless communication circuit, the wearable device being connected with the electronic device through wireless communication, when wireless charging is performed by using the wireless charging circuit, may adjust a charging voltage of the wireless charging, based on at least one of the first information or the second information, and may adjust an amount of charging power by adjusting a charging current of the wireless charging.

According to an embodiment, when the wireless charging pad is not a wireless charging pad capable of outputting a high voltage, the processor may start the wireless charging with a default voltage.

According to an embodiment, the processor may acquire third information that is different from the first information and corresponds to another ambient sound of the electronic device received through the microphone.

According to an embodiment, when there is a difference between the first information and the third information, the processor may adjust the charging voltage of the wireless charging based on a difference value between the first information and the third information.

According to an embodiment, when the user is in a REM sleep state, the processor may adjust the charging volage of the wireless charging to a maximum output voltage, and, when the user is not in the REM sleep state, the processor may adjust the charging voltage of the wireless charging based on the first information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

The invention claimed is:

1. An electronic device, comprising:
a microphone;
a wireless charging circuit;
a wireless communication circuit; and
a processor configured to:
acquire first information corresponding to an ambient noise of the electronic device through the microphone;
acquire second information related to a sleep of a user from a wearable device through the wireless communication circuit, the wearable device being connected with the electronic device through wireless communication; and
when wireless charging is performed by using the wireless charging circuit, adjust a charging voltage of the wireless charging, based on the first information and the second information.

2. The electronic device of claim 1, further comprising a battery.

3. The electronic device of claim 1, wherein the electronic device is configured to perform wireless communication with a wireless charging pad by using in-band communication.

4. The electronic device of claim 3, wherein, when the wireless charging pad is not a wireless charging pad capable of outputting a high voltage, the processor is further configured to start the wireless charging with a default voltage.

5. The electronic device of claim 1, wherein the processor is further configured to adjust an amount of charging power by adjusting a charging current of the wireless charging.

6. The electronic device of claim 1, wherein the processor is further configured to acquire third information that is different from the first information and corresponds to another ambient sound of the electronic device received through the microphone.

7. The electronic device of claim 6, wherein, when there is a difference between the first information and the third information, the processor is further configured to adjust the charging voltage of the wireless charging based on a difference value between the first information and the third information.

8. The electronic device of claim 1, wherein the processor is further configured to determine whether the user is in a rapid eye movement (REM) sleep state, based on the second information.

9. The electronic device of claim 8, wherein, when the user is in the REM sleep state, the processor is further configured to adjust the charging voltage of the wireless charging to a maximum output voltage.

10. The electronic device of claim 8, wherein, when the user is not in the REM sleep state, the processor is further configured to adjust the charging voltage of the wireless charging based on the first information.

11. An operating method of an electronic device, the method comprising:
acquiring first information corresponding to an ambient noise of the electronic device through a microphone included in the electronic device;
acquiring second information related to a sleep of a user from a wearable device through a wireless communication circuit included in the electronic device, the wearable device being connected with the electronic device through wireless communication; and when wireless charging is performed by using a wireless charging circuit, adjusting a charging voltage of the wireless charging, based on the first information and the second information.

12. The method of claim 11, further comprising adjusting an amount of charging power of the wireless charging by adjusting a charging current of the wireless charging.

13. The method of claim 11, comprising acquiring third information that is different from the first information and corresponds to another ambient sound of the electronic device received through the microphone.

14. The method of claim 13, further comprising, when there is a difference between the first information and the third information, adjusting the charging voltage of the wireless charging based on a difference value between the first information and the third information.

15. The method of claim 11, further comprising:

when the user is in a REM sleep state, adjusting the charging voltage of the wireless charging to a maximum output voltage; and when the user is not in the REM sleep state, adjusting the charging voltage of the wireless charging based on the first information.

16. An electronic device which performs wireless communication with a wireless charging pad by using in-band communication, the electronic device comprising:

a microphone;

a battery;

a wireless charging circuit;

a wireless communication circuit; and a processor configured to:

acquire first information corresponding to an ambient noise of the electronic device through the microphone;

acquire second information related to a sleep of a user from a wearable device through the wireless communication circuit, the wearable device being connected with the electronic device through wireless communication;

when wireless charging is performed by using the wireless charging circuit, adjust a charging voltage of the wireless charging, based on the first information and the second information; and adjust an amount of charging power by adjusting a charging current of the wireless charging.

17. The electronic device of claim 16, wherein, when the wireless charging pad is not a wireless charging pad capable of outputting a high voltage, the processor is further configured to start the wireless charging with a default voltage.

18. The electronic device of claim 16, wherein the processor is further configured to acquire third information that is different from the first information and corresponds to another ambient sound of the electronic device received through the microphone.

19. The electronic device of claim 18, wherein, when there is a difference between the first information and the third information, the processor is further configured to adjust the charging voltage of the wireless charging based on a difference value between the first information and the third information.

20. The electronic device of claim 16, wherein, when the user is in a rapid eye movement (REM) sleep state, the processor is further configured to adjust the charging volage of the wireless charging to a maximum output voltage, and wherein, when the user is not in the REM sleep state, the processor is further configured to adjust the charging voltage of the wireless charging based on the first information.

* * * * *